United States Patent [19]
Brownlee

[11] Patent Number: 5,910,773
[45] Date of Patent: Jun. 8, 1999

[54] OXYGEN SUPPLY SYSTEM FOR WHEELED VEHICLES

[76] Inventor: David W. Brownlee, 826 Eleventh St., Oakmont, Pa. 15139

[21] Appl. No.: 09/135,927

[22] Filed: Jan. 18, 1998

[51] Int. Cl.$^6$ .................................................. G08B 23/00
[52] U.S. Cl. .......................................... 340/576; 180/272
[58] Field of Search ..................................... 340/575, 576; 180/272; 128/201.21, 205.24; 204/230; 205/349

[56] References Cited

U.S. PATENT DOCUMENTS

| | | | |
|---|---|---|---|
| 4,725,824 | 2/1988 | Yoshioka | 340/575 |
| 4,728,939 | 3/1988 | Otani | 340/576 |
| 4,928,090 | 5/1990 | Yoshimi et al. | 340/575 |
| 4,953,111 | 8/1990 | Yamamoto et al. | 364/569 |
| 5,036,852 | 8/1991 | Leishman | 128/630 |
| 5,037,518 | 8/1991 | Young et al. | 204/230 |
| 5,589,052 | 12/1996 | Shimamune et al. | 205/349 |
| 5,690,797 | 11/1997 | Harada et al. | 204/229 |
| 5,706,801 | 1/1998 | Remes et al. | 128/202.26 |
| 5,729,619 | 3/1998 | Puma | 382/115 |

*Primary Examiner*—Nina Tong

[57] ABSTRACT

This invention provides supplemental oxygen to the passenger compartment of wheeled vehicles to reduce drowsiness of drivers of wheeled vehicles so as to reduce the number of accidents caused by drowsy drivers. The invention also makes drivers and passengers in wheeled vehicles more alert and feel better by increasing the percentage of oxygen in the passenger compartments of wheeled vehicles to a beneficial and safe level.

8 Claims, 1 Drawing Sheet

OXYGEN SUPPLY SYSTEM FOR WHEELED VEHICLES

BACKGROUND OF THE INVENTION

1. Field of the Invention

This invention relates to wheeled vehicles such as cars, trucks, tractors and buses and in particular to a system for supplying oxygen to the passenger compartments in such vehicles. The system generates oxygen from water using electricity from the vehicle's alternator or generator and includes a regulator for regulating the oxygen that is fed to the passenger compartment to maintain the oxygen content of the air in the compartment within an optimum range.

2. Description of the Prior Art

Many vehicular accidents are caused every year by drivers falling asleep at the wheel of their vehicles. Long hours at the wheel, the monotony of driving, and other factors result in drowsiness and accidents or near misses. Some experts have opined that more vehicular accidents are caused by sleepy drivers than by drunken drivers.

Drivers attempt to stay awake by drinking coffee, taking caffeine pills, opening the car windows, and playing the car radio loudly, among other things. Laws have been enacted that limit the hours that truckers and bus drivers can drive so as to minimize accidents caused by drowsiness. Numerous inventions have also been made for detecting drowsiness in a driver and setting off an alarm to rouse the driver. See, for example, U.S. Pat. Nos. 4,725,824; 4,728,939; 4,953,111; and 5,729,619. However, none of these things has been effective to significantly reduce the number of accidents caused by sleepy drivers.

Accordingly, an improved system is needed for reducing drowsiness of drivers and reducing accidents caused by sleepy drivers.

SUMMARY OF THE INVENTION

The present invention increases alertness of drivers of wheeled vehicles so as to reduce the number of accidents caused by drowsy drivers. The invention also makes drivers and passengers in wheeled vehicles more alert and feel better by improving the percentage of oxygen in the passenger compartments of wheeled vehicles.

The oxygen content of air that people breathe is generally about 21 percent by volume (about 23% by weight) depending on location and ambient conditions. The oxygen content of most ambient air has decreased slightly during the last couple of centuries. This may be a result of reductions in plant life and/or increases in the use of fossil fuels, among other factors. The oxygen content in some places such as office buildings, buses, cars and other closed or partially closed compartments is usually less than the oxygen content of outside air.

This invention provides an electrolyzing system for evolving gaseous oxygen from water and feeding the oxygen into the passenger compartment of a wheeled vehicle. The invention detects the oxygen content of the air in the passenger compartment and controls the electrolyzing system to regulate the oxygen flow into the compartment. The system can be set to provide oxygen into the compartment if the percent of oxygen in the compartment falls to a preselected value and shut off the supply of oxygen when the oxygen content rises to a preselected value.

The optimum percent of oxygen in the passenger compartment for reduced drowsiness and increased alertness need be only a few percent above the percent of oxygen in ambient air. It is believed that raising the percent oxygen to a range of about 23–25% by volume can substantially increase the alertness of people breathing the air. It is important to keep the oxygen content in the passenger compartment from exceeding approximately 25% by volume to avoid a possible risk of fire hazard in the compartment.

This invention provides a convenient and inexpensive system for providing a small increase in the oxygen content of air in passenger compartments. The invention provides a system that helps drivers and passengers remain alert and maintain well-being. This invention reduces drowsiness of drivers and reduces accidents caused by drowsiness.

The above and other objects and advantages of this invention will be more fully understood and appreciated by reference to the following description and the drawings which form a part hereof.

DESCRIPTION OF A PREFERRED EMBODIMENT

Figure 1:
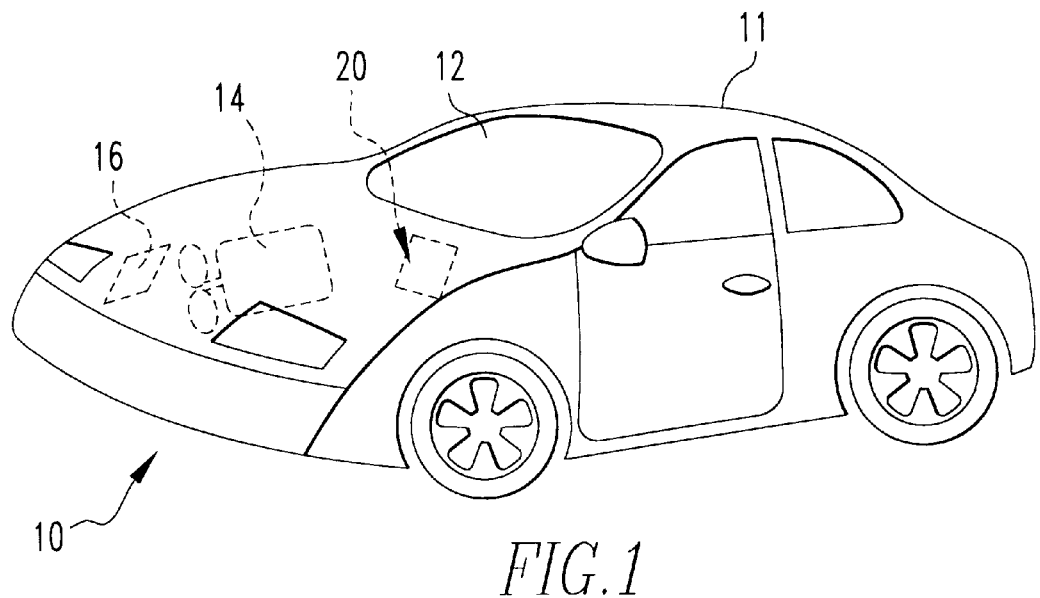
FIG. 1 is a schematic representation of a wheeled vehicle having a system for providing oxygen to passenger compartments in accordance with this invention.

FIG. 1 depicts an automobile 10, as a typical wheeled vehicle, which is suitable for use of the present invention. Other wheeled vehicles having driver/passenger compartments that can benefit from this invention includes trucks, buses and tractors. The car 10 has a body 11 with a passenger compartment 12, an internal combustion engine 14 and an electricity generating system 16. The electricity generating system 16 may be a conventional generator, an alternator or other like devices which are driven by the internal combustion engine 14 and produce electricity for a variety of uses such as lights, radio, starter, horn, etc., not shown.

In accordance with this invention the car 10 or other wheeled vehicle has a system 20 for producing and supplying gaseous oxygen to the passenger compartment 12. The system 20 can be located in the car 10 at a variety of locations such as the fire wall of the engine compartment, as shown in FIG. 1, or other locations in the engine compartment, passenger compartment 12 or trunk.

Figure 2:
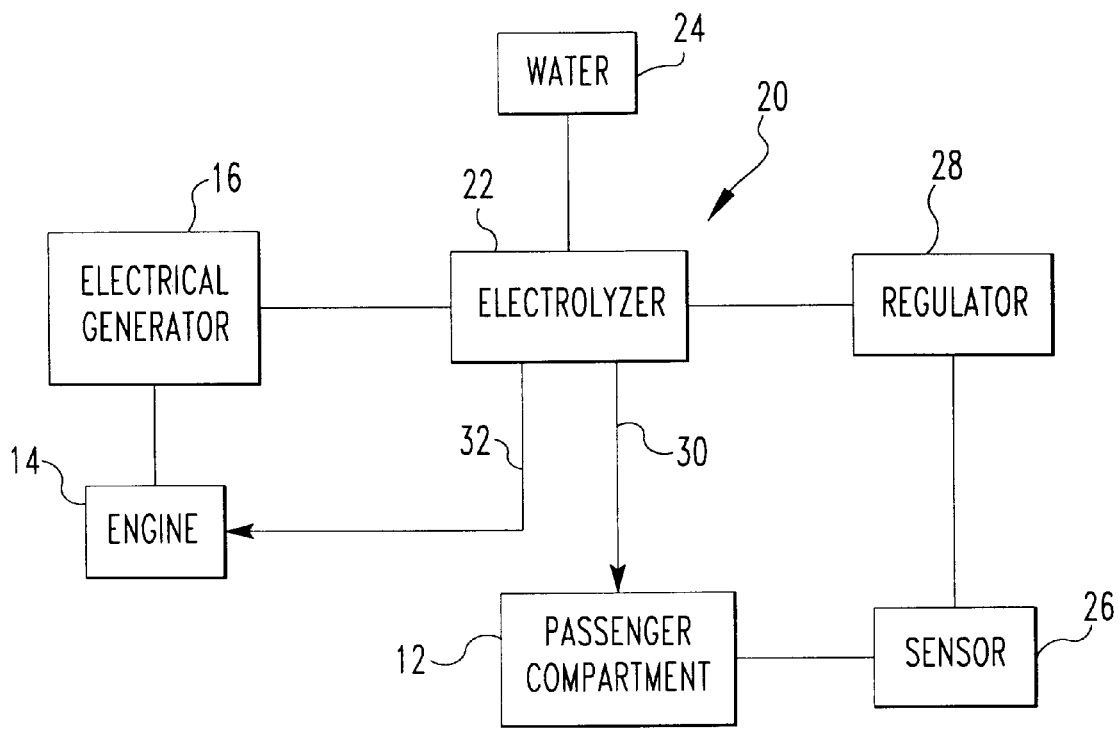
FIG. 2 is a flow diagram of an oxygen supply system for a wheeled vehicle in accordance with this invention.

As shown in FIG. 2, the oxygen generating system 20 preferably comprises an electrolyzing unit 22, a container 24 for water, a sensor 26 and a regulator 28. The system preferably uses deionized or distilled water to avoid or minimize build-up of scale and debris in the electrolyzer 22. Electrolyzing devices are well known in the art as is disclosed in U.S. Pat. Nos. 5,037,518; 5,589,052; and 5,690,797, the disclosures of which are incorporated herein by reference. Such electrolyzing systems can generate high purity gases under pressure in a safe manner without need for gas compressors. Apparatus for generating gaseous oxygen are available from companies such as Packard Instrument Company of Downers Grove, Ill.

The electrolyzer 22 produces gaseous hydrogen, as well as oxygen. The hydrogen gas may be used as a supplement fuel for the internal combustion engine, or can alternatively be exhausted to the atmosphere. The hydrogen gas is produced in relatively small quantities, and can be safely and easily dispersed into the ambient air. However, use of hydrogen as a fuel supplement for the engine is desirable to make the system more cost effective.

The system further has a pipe 30 or other conduit device for flow of oxygen to the passenger compartment and a pipe 32 for flow of hydrogen to the engine or to an outside vent. The generation of oxygen and hydrogen by the electrolyzer 22 can produce sufficient gas pressure to move the gases through the pipes without need for a compressor, fan or other such device, but such flow-enhancing devices are not excluded from use in this invention.

It is important that the system 20 include an oxygen sensor 26 or other measuring device for sensing and measuring the oxygen content in the air in the passenger compartment 12. Oxygen sensors are well known in the art as disclosed by U.S. Pat. Nos. 5,036,852 and 5,706,801, the disclosures of which are incorporated herein by reference. Oxygen concentration sensors are available from Douglas Scientific of Kansas City, Kans., among other companies.

The system further includes a regulator 28 for regulating or controlling the flow of oxygen from the electrolyzer 22 through pipe 30 into the passenger compartment 12. The regulator 28 receives the measurement from sensor 26 and operates much like a thermostat to regulate oxygen flow. The regulator starts the flow of oxygen when the percent oxygen concentration in the passenger compartment 12 falls to or below a preselected percent, such as 20% by volume, and stops the flow when the concentration rises to a preselected percent such as 24 or 25% by volume.

For safety reasons, it is critical that the second preselected oxygen content for shutting the electrolyzer off be at a safe level which does not create a risk of rapid combustion of lighted objects such as cigarettes or other combustibles that might be intentionally or accidentally ignited in the passenger compartment. However, significant increases in driver alertness and reductions in drowsiness should result from small increases (such as 2–3% increases) in the oxygen content in the passenger compartment. Such small increases are safely below an oxygen level of about 25% by volume that might be hazardous.

The regulator 28 can optionally regulate the flow of oxygen to the passenger compartment 12 either by switching the electrolyzer 22 on and off or by operating a valve, not shown, which controls the oxygen flow into the passenger compartment or to another destination such as a storage tank or an exhaust outlet. Computer controlled regulators for such purposes are well known in the art.

It is therefore seen that this invention provides a system for supplying a beneficial quantity of oxygen to the passenger/driver compartment of a wheeled vehicle in a safe and efficient manner. The system can potentially prevent many accidents caused by sleepy drivers and also improve the well-being of the driver and passengers in vehicles.

Although a preferred embodiment of this invention has been selected for purposes of illustration and explanation, numerous modifications can be made to such preferred embodiment without departing from the invention or the scope of the claims appended hereto.

What is claimed is:

1. In a wheeled vehicle having a passenger compartment, an internal combustion engine for propelling the vehicle and an electricity generating device, the improvement comprising a system for supplying gaseous oxygen to said passenger compartment for sleep, doze or drowsiness prevention, including:
    a container for water;
    an electrolysis system for electrolyzing water to evolve gaseous oxygen and gaseous hydrogen using electricity from said electricity generating device;
    a pipe for flowing gaseous oxygen from said electrolysis system to said passenger compartment;
    an oxygen concentration detection device for detecting the oxygen content of air in said passenger compartment; and
    a regulator for regulating the flow of oxygen through said pipe to said passenger compartment to commence the flow when the oxygen content in said passenger compartment falls below a first preselected level and to stop when the oxygen content in said compartment rises to a second preselected level.

2. A wheeled vehicle as set forth in claim 1 which includes a pipe for flowing gaseous hydrogen from said electrolysis system to said internal combustion engine.

3. A wheeled vehicle as set forth in claim 1 in which said regulator energizes said electrolysis system when the oxygen content in said passenger compartment is below a preselected level and de-energizes said electrolysis system when the oxygen content in said passenger compartment has risen to a preselected level.

4. A wheeled vehicle as set forth in claim 1 in which said second preselected percent is about 24–25% by volume.

5. A wheeled vehicle as set forth in claim 1 in which said electrolysis system includes an anode that produces oxygen and a cathode that produces hydrogen.

6. A system for sleep, doze or drowsiness prevention by supplying gaseous oxygen to a passenger compartment in a wheeled vehicle having an internal combustion engine and an electricity generating device, comprising:
    a container for water;
    an electrolysis system for electrolyzing water to evolve gaseous oxygen and gaseous hydrogen using electricity from said generating device;
    a pipe for flowing gaseous oxygen from said electrolysis system to said passenger compartment;
    an oxygen concentration measuring device for measuring the oxygen content of air in said passenger compartment; and
    a regulator for regulating the flow of oxygen through said pipe to said passenger compartment so as to commence the flow when the oxygen content in said compartment falls below a preselected level of about 20–21 percent by volume and to stop the flow when the oxygen content rises to a second preselected level of about 24–25 percent by volume.

7. A system as set forth in claim 6 which includes a pipe for flowing gaseous hydrogen from said electrolysis system to said internal combustion engine.

8. A system as set forth in claim 6 in which said second preselected percent is 25%.

* * * * *